US012579698B2

(12) United States Patent
Lasserre et al.

(10) Patent No.: US 12,579,698 B2
(45) Date of Patent: Mar. 17, 2026

(54) METHOD AND APPARATUS OF ENCODING/DECODING POINT CLOUD GEOMETRY DATA CAPTURED BY A SPINNING SENSORS HEAD

(71) Applicant: Beijing Xiaomi Mobile Software Co., Ltd., Beijing (CN)

(72) Inventors: Sebastien Lasserre, Beijing (CN); Jonathan Taquet, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 267 days.

(21) Appl. No.: 18/553,816

(22) PCT Filed: Oct. 13, 2021

(86) PCT No.: PCT/CN2021/123661
§ 371 (c)(1),
(2) Date: Oct. 3, 2023

(87) PCT Pub. No.: WO2022/213568
PCT Pub. Date: Oct. 13, 2022

(65) Prior Publication Data
US 2024/0185472 A1 Jun. 6, 2024

(30) Foreign Application Priority Data
Apr. 9, 2021 (EP) ..................................... 21305460

(51) Int. Cl.
*G06T 9/00* (2006.01)
*G06T 9/40* (2006.01)

(52) U.S. Cl.
CPC ................ *G06T 9/001* (2013.01); *G06T 9/40* (2013.01)

(58) Field of Classification Search
CPC ........... G06T 9/001; G06T 9/004; G06T 9/40; G06T 9/005; G06T 15/08; G06T 17/10; G06T 2200/04; G06T 2207/10028; G06T 7/11; G06T 9/007; H04N 19/597; H04N 19/91; H04N 19/70; H04N 19/124; H04N 19/96; H04N 19/176; H04N 19/13; H04N 19/184; H04N 19/587; H04N 21/2343;
(Continued)

(56) References Cited

U.S. PATENT DOCUMENTS

2018/0053324 A1* 2/2018 Cohen ..................... G06T 9/005
2020/0111237 A1 4/2020 Tourapis et al.
(Continued)

OTHER PUBLICATIONS

Office Action issued by the Intellectual Property India on Apr. 22, 2025, in corresponding Application No. IN 202347075800, 7 pages.

*Primary Examiner* — Zhiyu Lu
(74) *Attorney, Agent, or Firm* — Finnegan, Henderson, Farabow, Garrett & Dunner, L.L.P.

(57) ABSTRACT

There is provided methods and apparatus of encoding/decoding a point cloud representing a physical object, each point of the point cloud being associated with a residual radius between a radius responsive to a distance of the point from a referential and a predicted radius. The method entropy encodes/decodes the sign of the residual radius associated with a current point of the point cloud based on the sign of a previously entropy encoded/decoded non-zero residual radius associated with a previous point.

20 Claims, 12 Drawing Sheets

(58) Field of Classification Search
CPC .. H04N 21/4402; H04N 19/44; H04N 19/593;
H04N 19/88; H04N 19/00
See application file for complete search history.

(56) References Cited

U.S. PATENT DOCUMENTS

| | | | | |
|---|---|---|---|---|
| 2020/0175725 | A1 | 6/2020 | Mekuria | |
| 2020/0280710 | A1 | 9/2020 | Vosoughi et al. | |
| 2023/0328285 | A1* | 10/2023 | Oh .......................... | H04N 19/70 |
| | | | | 375/240.02 |
| 2023/0401754 | A1* | 12/2023 | Champel ................. | H03M 7/30 |
| 2024/0046528 | A1* | 2/2024 | Taquet ................... | G06T 9/004 |

* cited by examiner

METHOD AND APPARATUS OF ENCODING/DECODING POINT CLOUD GEOMETRY DATA CAPTURED BY A SPINNING SENSORS HEAD

CROSS-REFERENCE TO RELATED APPLICATIONS

This application is a U.S. National Stage Application of International Application No. PCT/CN2021/123661, filed Oct. 13, 2021, which claims priority to European Patent Application No. 21305460.4 filed on Apr. 9, 2021, the entire content of both of which is hereby incorporated by reference.

FIELD

The present application generally relates to point cloud compression and, in particular to methods and apparatus of encoding/decoding point cloud geometry data captured by a spinning sensor head.

BACKGROUND

The present section is intended to introduce the reader to various aspects of art, which may be related to various aspects of at least one embodiments of the present application that is described and/or claimed below. This discussion is believed to be helpful in providing the reader with background information to facilitate a better understanding of the various aspects of the present application.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x,y and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely MPEG-I part 5 (ISO/IEC 23090-5) or Video-based Point Cloud Compression (V-PCC)

MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data captured by a spinning sensor head, e.g. a spinning Lidar head, mounted on a moving vehicle. This usually requires a simple and low-latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to sparse geometry data captured by a spinning sensor head have been already exploited to get very efficient encoding/decoding methods.

For example, G-PCC exploits the elevation angle (relative to the horizontal ground) of capture from a spinning sensor head as depicted on FIGS. 1 and 2. A spinning sensor head 10 comprises a set of sensors 11 (for example lasers), here five sensors are represented. The spinning sensor head 10 may spin around a vertical axis z to capture geometry data of a physical object, i.e. the 3D locations of points of the point cloud. The geometry data captured by the spinning sensor head is then represented in spherical coordinates ($r_{3D}$, $\phi$, $\theta$), where $r_{3D}$ is the distance of a point P from the spinning sensor head's center, $\phi$ is an azimuthal angle of the sensor head's spin relative to a referential, and $\theta$ is an elevation angle for an elevation angle index k of a sensor of the spinning sensor head relative to a horizontal referential plane (here the y axis). The elevation angle index k may be, for instance, an elevation angle of a sensor k, or a k-th sensor position, in case a single sensor is successively probing for the each one of the successive elevation angles.

A regular distribution along the azimuthal angle has been observed on geometry data captured by a spinning sensor head as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i$ $\forall i=0$ to I−1 where I is a number of azimuthal angles used for the capture of the points and $\theta_k$ $\forall k=0$ to K−1 where K is a number of sensors of the spinning sensor head 10. Basically, G-PCC represents sparse geometry data captured by a spinning sensor head on a 2D discrete angular plane ($\phi$, $\theta$) as depicted on FIG. 3, together with a radius value $r_{3D}$ for each point.

This quasi 1D property has been exploited in G-PCC in both the occupancy tree and the predictive tree by predicting, in the spherical coordinates space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into coordinates ($\phi$, $\theta$) and from the location of these coordinates relative to discrete coordinates ($\phi_i$, $\theta_k$) obtained from already coded points.

The predictive tree directly codes a first version of location of a current point P in the spherical coordinates (r, $\phi$, $\theta$), where r may be either the radius $r_{3D}$ or a projected radius $r_{2D}$ on the horizontal xy plane as depicted on FIG. 4 by $r_{2D}$, using the quasi 1D nature (r, $\phi_i$, $\theta_k$) of this coordinate space. In the following, the radius r will refers to $r_{2D}$. Then, spherical coordinates (r, $\phi$, $\theta$) are converted into 3D cartesian coordinates (x,y,z) and a xyz residual is coded to tackle the errors of coordinate conversion, the approximation of elevation and azimuthal angles and potential noise.

As above explained capturing point cloud geometry data captured by a spinning sensor head 10 is advantageously represented in the (r, $\phi$, $\theta$) coordinate space. The angular coordinates ($\phi$, $\theta$) may be efficiently compressed thanks to the quasi (up to noise) discrete nature of the angles. However, radius r may take any value depending on the distance of the probed object relative to the spinning sensor head 10. Advantageously, the radius r of a point of the point cloud can be predicted from the radius of neighboring already coded points to obtain and encode a residual radius by a method 100 as depicted on FIG. 5.

FIG. 5 illustrates a method 100 of encoding a residual radius in a bitstream in accordance with prior art.

In step 110, a predicted radius $r_{pred}$ is selected as a prediction of a radius r of a current point.

An example of predicted radius $r_{pred}$ is given by equation (7) as described later.

A predicted radius $r_{pred}$ may also be a coordinate of predicted spherical coordinates ($r_{pred}$, $\phi_{pred}$, $\theta_{pred}$) derived from a prediction mode selected from a list of candidate prediction modes. Selection of a prediction mode may be done by minimizing a rate or rate-distorsion based cost function.

The selected prediction mode may be identified in the list of prediction mode by a prediction mode index $I_{sel}$ which is signalled in a bitstream B (step 120). A prediction mode index $I_{sel}$ is signalled in the bitstream B for each point of the point cloud (or equivalently for each leaf node of the G-PCC predictive tree).

For example, a candidate prediction mode may equal to ($r_{min}$, $\phi_0$, $\theta_0$), where $r_{min}$ is the minimum radius value (provided in the geometry parameter set), and $\phi_0$ and $\theta_0$ are equal to 0 if a current node (current point P) has no parent or are equal to azimuthal and elevation angles of the point associated with the parent node.

Another candidate prediction mode may equal to $(r_0, \phi_0, \theta_0)$, where $r_0$, $\phi_0$ and $\theta_0$ are respectively the radius, azimuthal and elevation angle of the point associated with the parent node of a current node.

Another candidate prediction mode may equal to a linear prediction of the radius, azimuthal and elevation angles $(r_0, \phi_0, \theta_0)$ of the point associated with the parent node of a current node, and the radius, azimuthal and elevation angle $(r_1, \phi_1, \theta_1)$ of the point associated with the grand-parent node. For example, the candidate prediction mode is given by $2*(r_0, \phi_0, \theta_0)-(r_1, \phi_1, \theta_1)$.

Another candidate prediction mode may equal to a linear prediction of the radius, azimuthal and elevation angles $(r_0, \phi_0, \theta_0)$ of the point associated with the parent node of a current node, the radius, azimuthal and elevation angles $(r_1, \phi_1, \theta_1)$ of the point associated with the grand-parent node and the radius and the azimuthal and elevation angles $(r_2, \phi_2, \theta_2)$ of the point associated with the great grand-parent.

For example, the candidate prediction mode is given by $(r_0, \phi_0, \theta_0)+(r_1, \phi_1, \theta_1)-(r_2, \phi_2, \theta_2)$.

In step 130, a residual radius $r_{res}=r-r_{pred}$ is calculated.

In step 140, a first flag $f_0$ is signalled in the bitstream B to indicate if the residual radius $r_{res}$ is null or not.

If the residual radius $r_{res}$ is null, the encoding of the residual radius is completed and the method iterates for encoding a residual radius of a next point of the point cloud.

Otherwise, in step 150, the magnitude $|r_{res}|-1$ where $|.|$ indicate "an absolute value" is encoded in the bitstream B. Typically, the magnitude is encoded using a series of flags (each flag indicating if the magnitude equals a specific value) and/or using an exp-Golomb coder. In step 160, the sign $s_{res}$ is encoded in the bitstream, typically using one bit per sign. Then, the method iterates for encoding a residual radius of a next point of the point cloud.

FIG. 6 illustrates a method 200 of decoding the radius from a bitstream in accordance with prior art.

In step 210, a first flag $f_0$ is accessed from the bitstream B.

If the first flag $f_0$ indicates that a residual radius of a current point is null, the decoding of the residual radius is completed.

Otherwise, in step 220, a magnitude $|r_{res}|-1$ is decoded from the bitstream B. In step 230, a sign $s_{res}$ of a residual radius is decoded from the bitstream B. In step 240, a signed residual radius $r_{res}$ is obtained from the decoded sign $s_{res}$ and the decoded magnitude.

In step 250, a predicted radius $r_{pred}$ is obtained from a prediction mode as explained in relation with FIG. 5. The decoded radius $r_{dec}$ is then obtained by adding the decoded residual radius $r_{res}$ and the predicted radius $r_{pred}$. Finally, the method iterates for decoding a residual radius and obtaining a decoded radius $r_{dec}$ of a next point of the point cloud.

FIG. 7 illustrates a point cloud encoder that is similar to G-PCC predictive tree based encoder using the residual radius encoding method 100 of FIG. 5.

First, cartesian coordinates (x,y,z) of points of the point cloud are transformed into spherical coordinates $(r, \phi, \theta)$ by $(r, \phi, \theta)=C2A(x,y,z)$ where r is the projected radius $r_{2D}$ on the horizontal xy plane as depicted on FIG. 4, $\phi$ is the azimuthal angle and $\theta$ is an elevation angle.

The transformation function C2A(.) is partly given by:

$$r = \text{round}(\text{sqrt}(x*x+y*y)/\Delta r)$$

$$\phi = \text{round}(\text{atan } 2(y, x)/\Delta\phi)$$

where round( ) is the rounding operation to the nearest integer value, sqrt( ) is the square root function, atan 2(y,x) is the arc tangent applied to y/x. The quantities $\Delta r$ and $\Delta\phi$ are quantization steps.

The angle $\theta$ is used hereafter as an elevation angle value, that would be obtained, for instance using $$\theta = \text{atan}\left(\frac{Z}{r}\right),$$

where atan(.) is an arc tangent function. Practically, in G-PCC for instance, the representation of $\theta$ is an integer value representing the elevation angle index k of $\theta_k$ (i.e. the index of the k-th elevation angle), and so operations presented hereafter (prediction, residual (de)coding, etc . . . ) performed on $\theta$ would be applied on the elevation angle index instead.

Residual spherical coordinates $(r_{res}, \phi_{res}, \theta_{res})$ between spherical coordinates $(r, \phi, \theta)$ and predicted spherical coordinates $(r_{pred}, \phi_{pred}, \theta_{pred})$ are then given by:

$$(r_{res}, \phi_{res}, \theta_{res})=(r, \phi, \theta)-(r_{pred}, \phi_{pred}, \theta_{pred}) \qquad (1)$$

where $(r_{pred}, \phi_{pred}, \theta_{pred})$ are spherical coordinates derived from a prediction mode as explained in relation with FIG. 5.

The residual spherical coordinates $(r_{res}, \phi_{res}, \theta_{res})$ are quantized, by operator Q(.) into quantized residual spherical coordinates $Q(r_{res}, \phi_{res}, \theta_{res})$ that are encoded in the bitstream B. The quantized residual radius $r_{res}$ may be encoded in the bitstream B using the encoding method 100 of FIG. 5.

The predicted azimuthal angle $\phi_{pred}$ may be obtained by using a selected prediction mode.

In a variant, the predicted azimuthal angle $\phi_{pred}$ can be refined into $\phi'_{pred}$ by additionally signaling in the bitstream B a (positive or negative) integer number $\mu$ representing the number of elementary steps $\Delta\phi$ to be added to the selected prediction mode.

$$\phi'_{pred}=\phi_{pred}+\mu*\Delta\phi$$

where the number $\mu$ is signalled in the bitstream B for each point of the point cloud (i.e. each node of the predictive tree).

Predicted cartesian coordinates $(x_{pred}, y_{pred}, z_{pred})$ are obtained by inverse transforming decoded spherical coordinates $(r_{dec}, \phi_{dec}, \theta_{dec})$ by:

$$(x_{pred}, y_{pred}, z_{pred})=A2C(r_{dec}, \phi_{dec}, \theta_{dec}) \qquad (2)$$

where decoded spherical coordinates $(r_{dec}, \phi_{dec}, \theta_{dec})$, as by a decoder, may be given by:

$$(r_{dec}, \phi_{dec}, \theta_{dec})=(r_{res,dec}, \phi_{res,dec}, \theta_{res,dec})+(r_{pred}, \phi_{pred}, \theta_{pred}) \qquad (3)$$

The decoded residual spherical coordinates $(r_{res,dec}, \phi_{res,dec}, \theta_{res,dec})$ may be the result of the inverse quantization (IQ) of quantized residual spherical coordinates $Q(r_{res}, \phi_{res}, \theta_{res})$.

Inverse transforming decoded spherical coordinates $(r_{dec}, \phi_{dec}, \theta_{dec})$ may be given by:

$$r=r_{dec}*\Delta r$$

$$x_{pred}=\text{round}(r*\cos(\phi_{dec}*\Delta\phi))$$

$$y_{pred}=\text{round}(r*\sin(\phi_{dec}*\Delta\phi))$$

$$z_{pred}=\text{round}(\tan(\theta_{dec})*r)$$

where sin( ), cos( ) and tan( ) are sine, cosine and tangent functions that may be approximated by operations working on fixed-point precision.

Residual cartesian coordinates $(x_{res}, y_{res}, z_{res})$ may be quantized $(Q)$ and quantized residual cartesian coordinates $Q(x_{res}, y_{res}, z_{res})$ may be encoded into the bitstream B.

Residual cartesian coordinates may be lossless coded when x,y,z quantization steps are equal to the original point precision (typically 1), or lossy coded when quantization steps are larger than the original point precision (typically quantization steps larger than 1).

Decoded cartesian coordinates $(x_{dec}, y_{dec}, z_{dec})$, as obtained by a decoder, are given by:

$$(x_{dec}, y_{dec}, z_{dec})=(x_{pred}, y_{pred}, z_{pred})+IQ\,(Q\,(x_{res}, y_{res}, z_{res})) \tag{4}$$

FIG. 8 illustrates a point cloud decoder that is similar to G-PCC predictive tree based decoder using a residual radius decoding method 200 of FIG. 6.

Quantized residual spherical coordinates $Q(r_{res}, \phi_{res}, \theta_{res})$ are decoded from the bitstream B. The quantized residual spherical coordinates $Q(r_{res}, \phi_{res}, \theta_{res})$ are inverse quantized to obtain decoded residual spherical coordinates $(r_{res,dec}, \theta_{res,dec}, \theta_{res,dec})$. The quantized residual radius $Q(r_{res,dec})$ may be decoded from the bitstream B by the decoding method 200 of FIG. 6.

Decoded spherical coordinates $(r_{dec}, \phi_{dec}, \theta_{dec})$ are obtained by equation (3)

where $(r_{pred}, \phi_{pred}, \theta_{pred})$ are spherical coordinates derived from a prediction mode as explained in relation with FIG. 5 and in a same method as performed by the encoding method. Then, predicted cartesian coordinates $(x_{pred}, y_{pred}, z_{pred})$ are obtained from equation (2).

In a variant, the predicted azimuthal angle $\phi_{pred}$, obtained by using a prediction mode identified from a prediction mode index accessed from the bitstream B, can be refined into $\phi'_{pred}$ given by:

$$\phi'_{pred}=\phi_{pred}+\mu^*\Delta\phi$$

The number $\mu$ is accessed from the bitstream B for each point of the point cloud (i.e. each node of the predictive tree).

Quantized residual cartesian coordinates $Q(x_{res}, y_{res}, z_{res})$ are decoded from the bitstream and inverse quantized $(IQ)$ to obtain inverse quantized cartesian coordinates $IQ\,(Q\,(x_{res}, y_{res}, z_{res}))$. The decoded cartesian coordinates $(x_{dec}, y_{dec}, z_{dec})$ are given by equation (4).

The European patent application n° EP20306672 discloses a one chain coding/decoding methods as an alternative to the coding/decoding methods of FIGS. 7 and 8.

In the one chain coding, the 3D cartesian coordinates of points of the point cloud are represented in a 2D coordinates $(C\phi, \lambda)$ system together with radius values r $(r_{2D}$ or $r_{3D})$. The coordinate $C\phi$, for coarse azimuthal angle, is an azimuthal angle index of the sensor head's spin whose discrete values are denoted $C\phi_i$ $(\forall i=0$ to I−1), corresponding to an effective rotation of the sensor head by an angle $\phi_i$. The coordinate $\lambda$ is a sensor index whose discrete values are denoted $\lambda_k$ $(\forall k=0$ to K−1). The radius r belongs to a continuous range of values.

For each point of the point cloud, a sensor index $\lambda$ ($\lambda$ is one of the sensor indices $\lambda_k$ ($\forall k=0$ to K−1)) associated with a sensor that captured the point, an azimuthal angle index $C\phi$ ($C\phi$ is one of the discrete angles indices $C\phi_i$ ($\forall i=0$ to I−1)) representing a capture angle of said sensor, and a radius value r of spherical coordinates of the point are obtained.

The sensor index $\lambda$ and the azimuthal angle index $C\phi$ are obtained by converting 3D cartesian coordinates (x,y,z) representing the 3D location of a captured point. These 3D cartesian coordinates (x,y,z) may be output of the spinning sensors head 10.

For instance, assuming that an angle $\phi_{step}$ is an elementary azimuthal angle step between two successive probing of the sensor head for a given sensor index $\lambda$, and assuming that the arc tangent values of y/x returned by function atan 2(y, x) take values in [0; 2*π] interval, $C\phi$ may be obtained by:

$$C\phi=\text{round}(\phi/\phi_{step}),$$

where $\phi$=atan 2(y, x). The rotation angle $\phi_i$ would then be obtained by:

$$\phi_i=C\phi_i^*\phi_{step}.$$

In this case, the set of discrete angles $\phi_i$ $(0 \le i < I)$ is essentially defined by $\phi_i=i^*\phi_{step}$.

Also, $\lambda$ may be determined as being the index $\lambda_k$ of the sensor which has an elevation angle $\theta_k$ the closest to the elevation angle $\theta$ of the point of the point cloud.

Next, in one chain coding, the points of the point cloud are ordered based on the azimuthal angles indices $C\phi$ and the sensor indices $\lambda$.

In a variant, the points are ordered according to a lexicographic order based first on the azimuthal angle and then on the sensor index. The order index o(P) of a point P is obtained by:

$$o(P)=C\phi^*K+\lambda$$

In another variant, the points are ordered according to a lexicographic order based first on the sensor index and then on the azimuthal angle. The order index o(P) of a point P is obtained by:

$$o(P)=\lambda^*I+C\phi$$

Encoding ordered points into the bitstream B may comprise encoding order index difference $\Delta o_n$ representing, each, a difference between order indices of two consecutive points $P_{n-1}$ and $P_n$ (for n=2 to N):

$$\Delta o_n=o(P_n)-o(P_{n-1})$$

The order index $o(P_1)$ of the first point $P_1$ may be directly coded into the bitstream B. This is equivalent to arbitrary setting the order index of a virtual zero-th point to zero, i.e. $o(P_0)=0$, and coding $\Delta o_1=o(P_1)-o(P_0)=o(P_1)$.

Given the order index $o(P_1)$ of the first point and the order differences $\Delta o_n$, one can recursively reconstruct the order index $o(P_n)$ of any point $P_n$ by:

$$o(P_n)=o(P_{n-1})+\Delta o_n$$

Then, sensor indices $\lambda_n$ and azimuthal angle indices $C\phi_n$ associated with a point $P_n$ are obtained by:

$$\lambda_n=o(P_n) \text{ modulo } K \tag{5}$$

$$\phi_n=o(P_n)/K \tag{6}$$

where the division /K is the integer division (aka Euclidian division). Therefore, $o(P_1)$ and $\Delta o_n$ are an alternative representation of $\lambda_n$ and $C\phi_n$.

At the encoding side, a residual azimuthal angle $\phi_{res}$ is given by:

$$\phi_{res}=\phi-\phi_{pred}=\phi-C\phi_n^*\phi_{step} \tag{7}$$

where $\phi_{pred}$ is a predicted azimuthal angle.

Then, encoding ordered points into the bitstream B may also comprise encoding a residual $(Qr_{res}, Q\phi_{res,res})$ associated with ordered points given by:

$$(Qr_{res}, Q\phi_{res,res})=(r, Q\phi_{res})-(r_{pred}, Q\phi_{res,pred}) \tag{8}$$

where $Qr_{res}$ is a quantized residual radius, $Q\phi_{res}$ is a quantized residual azimuthal angle, $Q\phi_{res,res}$ is a residual of quantized residual azimuthal angle and $Q\phi_{res,pred}$ is a quantized predicted residual azimuthal angle. The elevation angle index $\theta_n$ for each point $P_n$ of the point cloud is not predictive encoded.

The quantized residual radius $Qr_{res}$ is obtained by applying a quantizer to a residual radius $r_{res}=r-r_{pred}$ where $r_{pred}$ equals to a spherical coordinate derived from a prediction mode as explained in relation with FIG. 5.

The quantized residual radius $Qr_{res}$ is encoded in the bitstream B using the encoding method 100 of FIG. 5 so that it can be decoded by the decoding method 200 of FIG. 6 and inverse quantized to obtain the inverse quantized residual radius $IQr_{res}$ equals to a decoded residual radius $r_{res,dec}$.

The residual azimuthal angle $\phi_{res}$ is given by:

$$\phi_{res}=\phi-\phi_{pred}$$

where $\phi_{pred}$ is a predictied azimuthal angle given by equation (7).

The quantized residual azimuthal angle $Q\phi_{res}$ is obtained by applying a quantizer Q to the residual azimuthal angle $\phi_{res}$ and is encoded in the bitstream B.

A decoded residual azimuthal angle $\phi_{res,dec}$ is equal to an inverse quantized residual azimuthal angle $IQ\phi_{res}$ obtained by applying an inverse quantizer IQ. A decoded azimuthal angle $\phi_{dec}$ is then obtained by adding the decoded residual azimuthal angle $\phi_{res,dec}$ to the predicted azimuthal angle $\phi_{pred}$ given by equation (7):

$$(r_{dec}, \phi_{dec})=(IQr_{res}, IQ\phi_{res})+(r_{pred}, \phi_{pred}) \qquad (9)$$

Encoding ordered points into the bitstream B also comprises obtaining residual cartesian coordinates $(x_{res}, y_{res}, z_{res})$ of three-dimensional cartesian coordinates of ordered points by:

$$(x_{res}, y_{res}, z_{res})=(x,y,z)-(x_{pred}, y_{pred}, z_{pred})$$

where (x,y,z) are the three-dimensional cartesian coordinates of the ordered points and $(x_{pred}, y_{pred}, z_{pred})$ are predicted cartesian coordinates obtained by:

$$\begin{cases} x_{pred} = r_{dec} * \cos(\phi_{dec}) \\ y_{pred} = r_{dec} * \sin(\phi_{dec}) \\ z_{pred} = r_{dec} * \tan\phi_n \end{cases}$$

Residual cartesian coordinates $(x_{res}, y_{res}, z_{res})$ are quantized into quantized residual cartesian coordinates $Q(x_{res}, y_{res}, z_{res})$ that are encoded into the bitstream B.

Residual cartesian coordinates may be lossless coded when x,y,z quantization steps are equal to the original point precision (typically 1), or lossy coded when quantization steps are larger than the original point precision (typically quantization steps larger than 1).

At the decoding side, order index differences $\Delta o_n$ (n=2 to N) are decoded from the bitstream B. Each order index difference $\Delta o_n$ is decoded for a current point $P_n$.

An order index $o(P_n)$ is obtained for a current point $P_n$ by:

$$o(P_n)=o(P_{n-1})+\Delta o_n$$

A sensor index $\lambda_n$ associated with a sensor that captured the current point and an azimuthal angle $\phi_n$ representing a capture angle of said sensor are derived from the order index $o(P_n)$ (equations (5) and (6)).

A decoded quantized residual radius $Qr_{res,dec}$ may be decoded from the bitstream B by the decoding method 200 of FIG. 6, and a decoded residual radius $r_{res,dec}$ is obtained by applying an inverse quantizer to $Qr_{res,dec}$.

A decoded radius $r_{dec}$ is then given by:

$$r_{dec}=r_{res,dec}+r_{pred}$$

where $r_{pred}$ is a spherical coordinate derived from a prediction mode as explained in relation with FIG. 5.

A quantized residual azimuthal angle $Q\phi_{res}$ is decoded from the bitstream B. The decoded residual azimuthal angle $\phi_{res,dec}$ is obtained by inverse quantizing:

$$\phi_{res,dec}=IQ(Q\phi_{res})$$

The decoded spherical coordinates are then given by:

$$(r_{dec}, \phi_{dec})=(r_{res,dec}, \phi_{res,dec})+(r_{pred}, \phi_{pred}) \qquad (10)$$

Decoded cartesian coordinates $(x_{dec}, y_{dec}, z_{dec})$ are given by:

$$(x_{dec}, y_{dec}, z_{dec})=(x_{pred}, y_{pred}, z_{pred})+IQ(Q(x_{res}, y_{res}, z_{res}))$$

where $IQ(Q(x_{res}, y_{res}, z_{res}))$ represent inverse-quantized quantized residual cartesian coordinates that is decoded from the bitstream B.

In the prior art, angular data in the form of $(C\phi, \lambda)$ can be well compressed. However, radius compression is much less efficient not only due to the continuous nature of the radius but also because of the weakness of the entropy coding of the residual radius $r_{res}$.

Consequently, most of the bitstream is made of data representing the radius. In our tests, it has been observed that radius data constitute between 70% and 90% of the total bitstream. Therefore, it is essential to tackle the problem of compressing radius data, say residual radius $r_{res}$, to obtain an overall better compression efficiency of either the GPCC predictive tree coding/decoding scheme or the one chain coding/decoding scheme.

SUMMARY

The following section presents a simplified summary of at least one embodiment in order to provide a basic understanding of some aspects of the present application. This summary is not an extensive overview of an embodiment. It is not intended to identify key or critical elements of an embodiment. The following summary merely presents some aspects of at least one of the embodiments in a simplified form as a prelude to the more detailed description provided elsewhere in the document.

According to a first aspect of the present application, there is provided a method of encoding a point cloud into a bitstream of encoded point cloud data representing a physical object, each point of the point cloud being associated with a residual radius between a radius responsive to a distance of the point from a referential and a predicted radius. The method comprises entropy coding a sign of a residual radius associated with a current point of the point cloud based on a sign of a previously entropy encoded non-zero residual radius associated with a previous point of the point cloud.

According to a second aspect of the present application, there is provided a method of decoding a point cloud from a bitstream of encoded point cloud data representing a physical object, each point of the point cloud being associated with a residual radius between a radius responsive to a distance of the point from a referential and a predicted radius. The method comprises entropy decoding a sign of a residual radius associated with a current point of the point cloud based on a sign of a previously entropy decoded non-zero residual radius associated with a previous point of the point cloud.

According to a third aspect of the present application, there is provided an apparatus of encoding a point cloud into a bitstream of encoded point cloud data representing a physical object. The apparatus comprising one or more processors configured to carry out a method according to the first aspect of the present application.

According to a fourth aspect of the present application, there is provided an apparatus of decoding, from a bitstream, a point of a point cloud representing a physical object. The apparatus comprising one or more processors configured to carry out a method according to the second aspect of the present application.

According to a fifth aspect of the present application, there is provided a non-transitory storage medium carrying instructions of program code for executing a method according to the first aspect of the present application.

According to a sixth aspect of the present application, there is provided a non-transitory storage medium carrying instructions of program code for executing a method according to the second aspect of the present application.

The specific nature of at least one of the embodiments as well as other objects, advantages, features and uses of said at least one of embodiments will become evident from the following description of examples taken in conjunction with the accompanying drawings.

BRIEF DESCRIPTION OF THE DRAWINGS

Reference will now be made, by way of example, to the accompanying drawings which show embodiments of the present application, and in which.

Similar reference numerals may have been used in different figures to denote similar components.

DESCRIPTION OF EMBODIMENTS

Figures 1, 2:
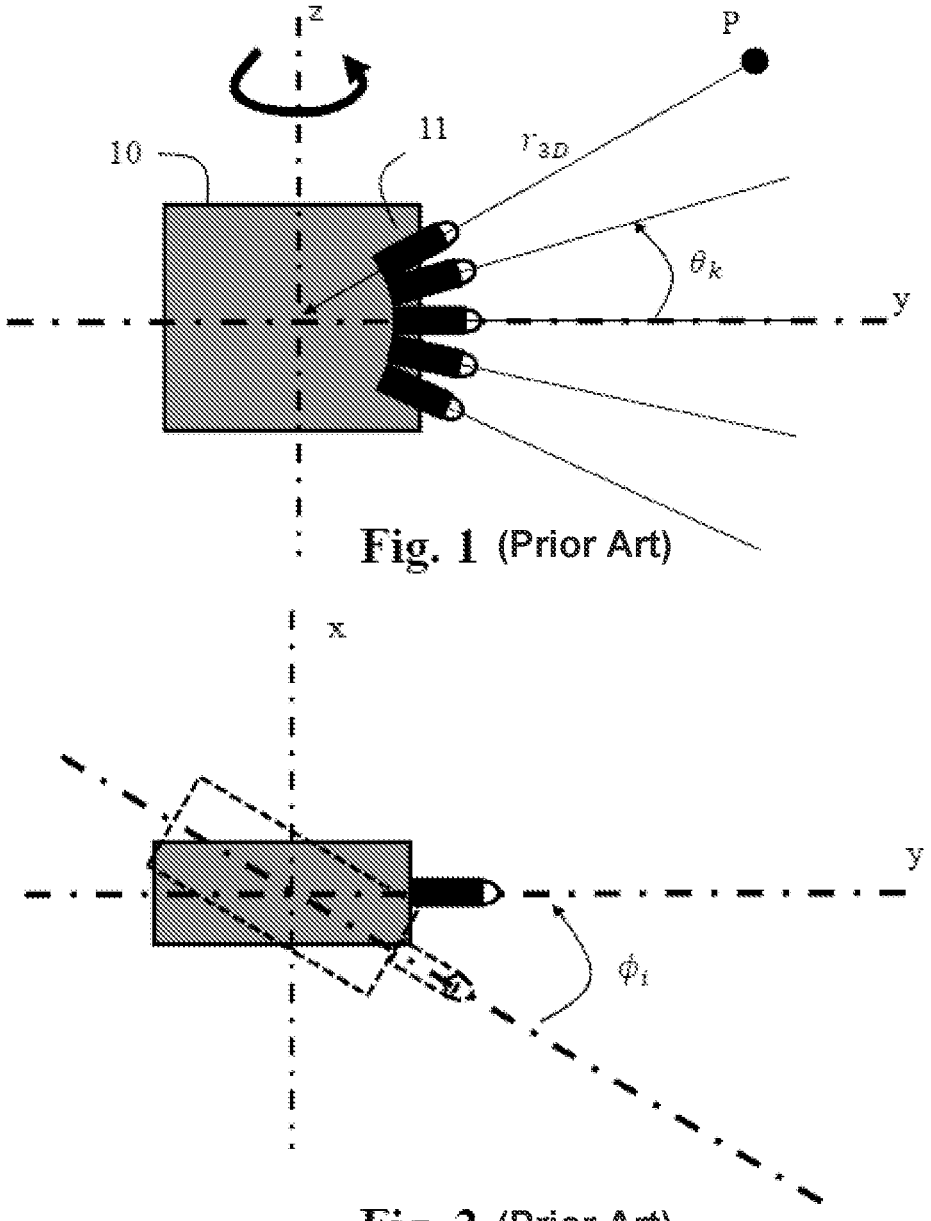
FIG. 1 illustrates a side view of a sensors head and some of its parameters in accordance with prior art.
FIG. 2 illustrates a top view of the sensors head and some of its parameters in accordance with prior art.
Figure 3:
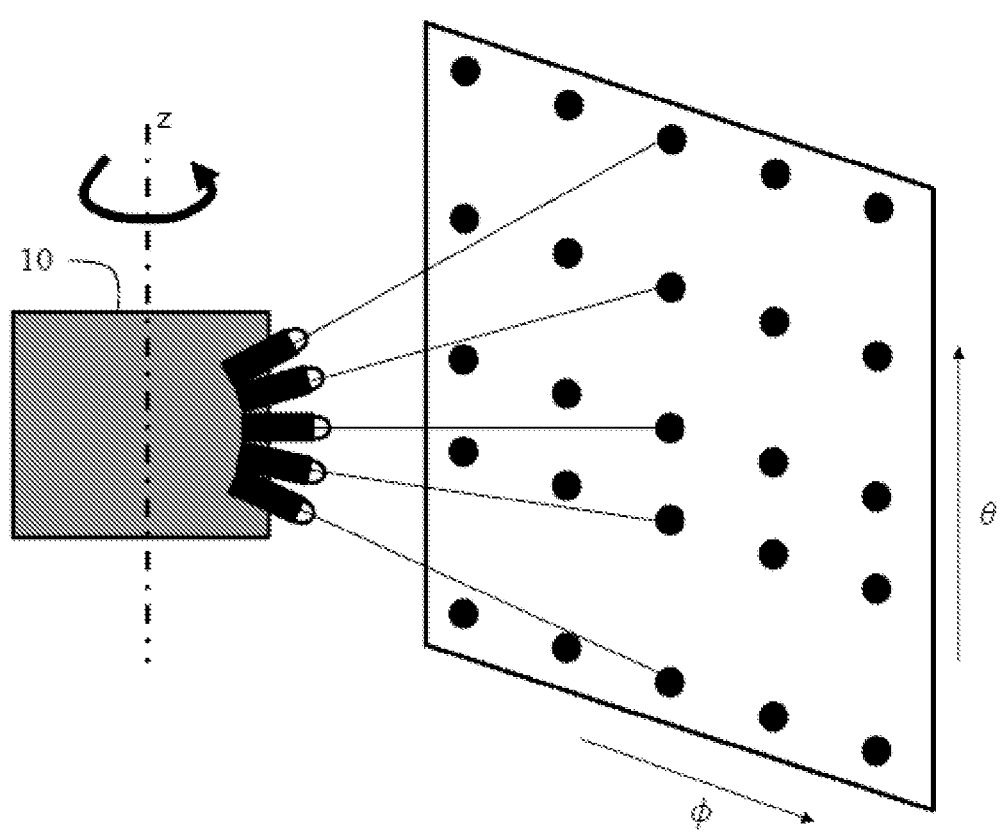
FIG. 3 illustrates a regular distribution of data captured by a spinning sensors head in accordance with prior art.
Figure 4:
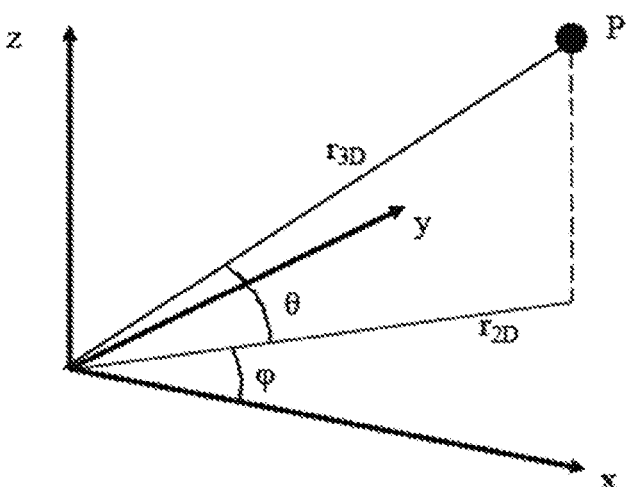
FIG. 4 illustrates a representation of a point in a 3D space in accordance with prior art.

Example embodiments are described more fully hereinafter with reference to the accompanying figures, in which examples of at least one of the embodiments are illustrated. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the present application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

The present invention relates to a field of encoding and decoding technology, aims to provide a technical solution of encoding/decoding point cloud data. Since the point cloud is a set of mass data, a large amount of memory may be consumed by storing the point cloud, also it is impossible to transmit the point cloud directly in the network layer without compressing the point cloud, so that it is required to compress the point cloud. Therefore, the present invention can be used in many application scenarios, as the point cloud is more and more widely used in autonomous navigation, real-time inspection, geographic information service, culture heritage/buildings protection, 3D immersion communication and interaction, and so on.

The present invention particularly relates to encoding/decoding the signs of the residual radius, which may decrease the coding cost of the signs. Overall coding efficiency of point coud geometry data captured by a spinning sensor head is then improved.

The present invention relates to a method of encoding/decoding a point cloud representing a physical object, each point of the point cloud being associated with a residual radius between a radius responsive to a distance of the point from a referential and a predicted radius.

The present invention entropy encodes/decodes the sign of the residual radius associated with a point of the point cloud based on the sign of a previously entropy encoded/decoded non-zero residual radius.

Figure 9:
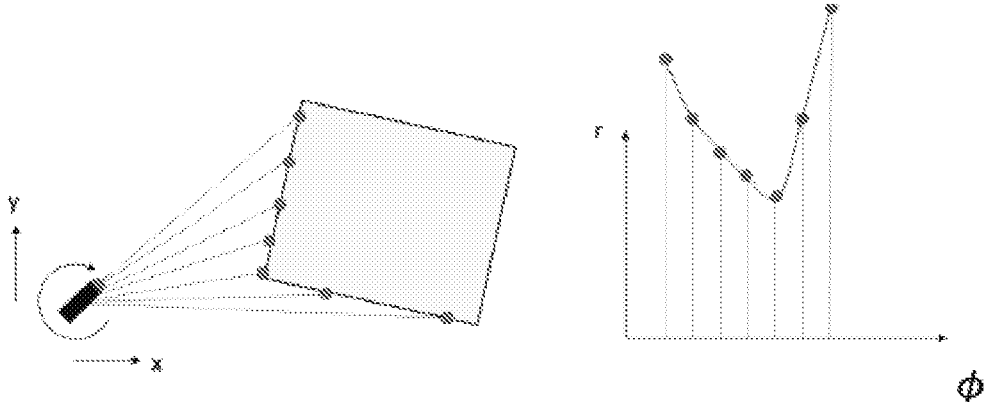
FIG. 9 illustrates the natural monotonicity of radius of points of a point cloud captured by a spinning sensor head.

Usually, the sign of any type of residual is somewhat unpredictable, leading to the cost of 1 uncompressible bit to code this sign in case the residual is not zero. However, when geometry data is captured by a spinning sensor head 10, the radius of captured points follows a natural monotonicity as illustrated in FIG. 9. On the left side, sensor beams are shown emitted from a sensor toward an object here schematically represented by a grey shaded rectangle. Seven points are captured, each for a particular azimuthal angle $\phi$. The diagram on the right side represents the evolution of the radius of the seven captured points versus the azimuthal angles. The diagram shows clearly the monotonicity of radius of captured points that is negative (the radius are decreasing when the azimuthal angle increases) and positive (the radius are increasing when the azimuthal angle increases). Therefore, if radius r of current points are predicted by radius $r_{prec}$ of previous points captured by the same sensor, the residual radius $r_{res}=r-r_{prev}$ exhibit a locally constant sign, either a series of negative residual radius or a series of positive residual radius. Of course, this is not always true but statistically significant enough to use this property to improve the compression of the signs $s_{res}$ of residual radius $r_{res}$.

Therefore, encoding/decoding the signs $s_{res}$ of $r_{res}$ based on signs $s_{res,prev}$ of previously coded residual radius $r_{res,prev}$ decreases the coding cost of the signs $s_{res}$ (lower than 1 bit per sign). Overall coding efficiency of point coud geometry data captured by a spinning sensor head 10 is then improved.

Figure 10:
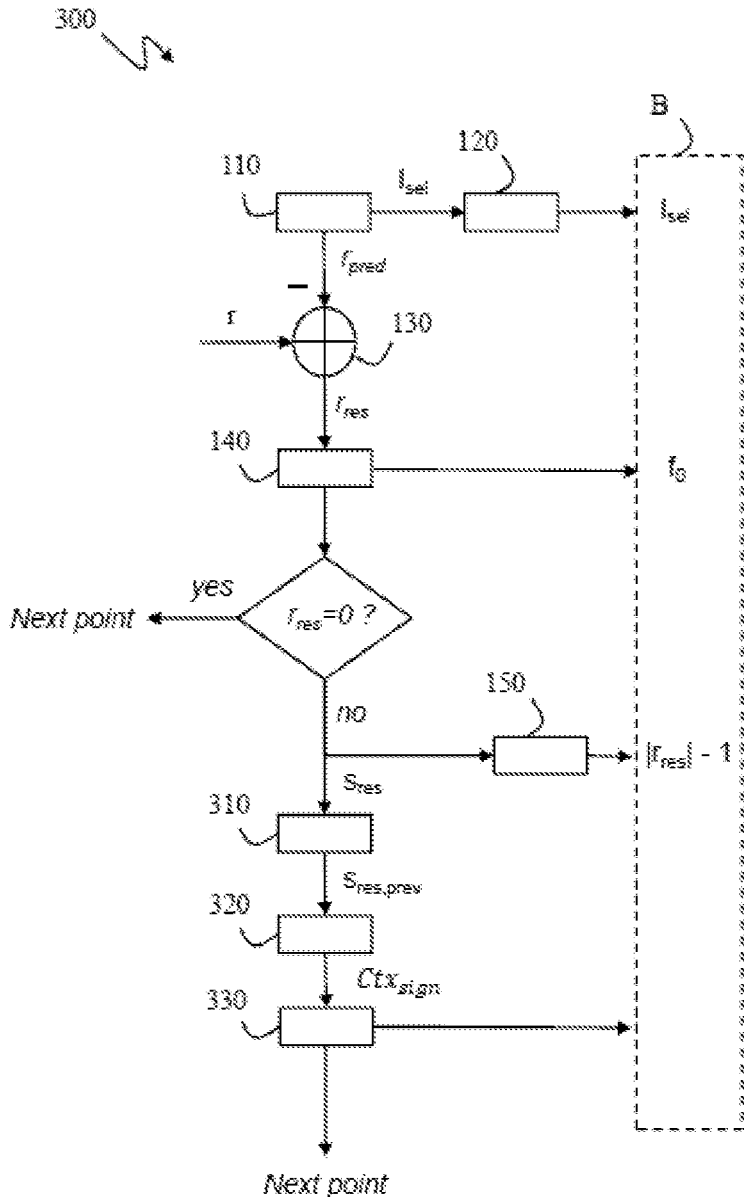
FIG. 10 illustrates a block diagram of steps of a method 300 of encoding residual radius in a bitstream in accordance with at least one embodiment of the present invention.

FIG. 10 illustrates a block diagram of steps of a method 300 of encoding residual radius $r_{res}$ in a bitstream B in accordance with at least one embodiment.

Figure 7:
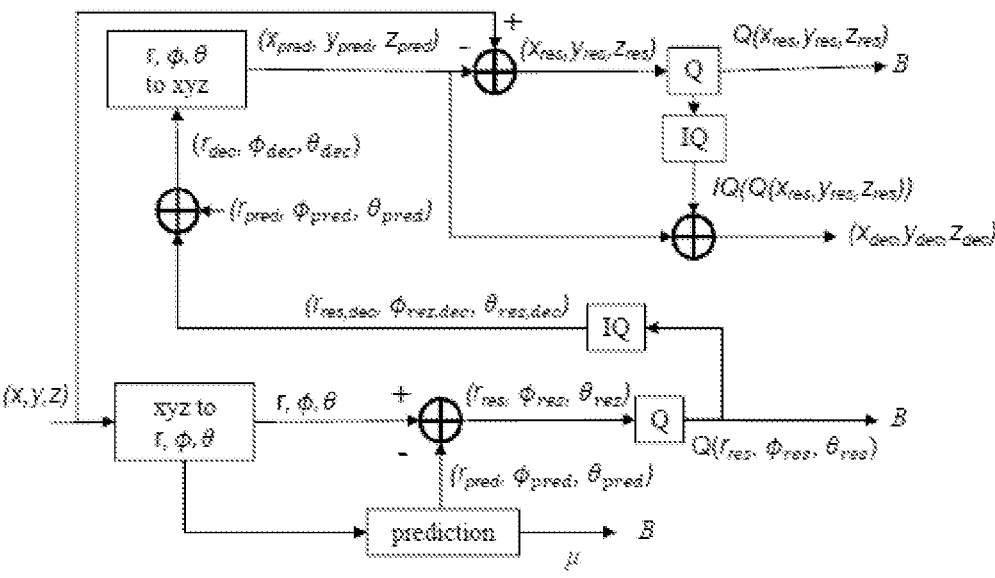
FIG. 7 illustrates a point cloud encoder that is similar to a G-PCC predictive tree based encoder in accordance with prior art.

The method is described for encoding a residual radius $r_{res}$ of a current point of the point cloud but extend to the encoding of quantized residual radius $Qr_{res}$ obtained, for example, as explained above in relation with FIG. 7 or in the one chain coding.

In one embodiment of the method 300, the entropy encoding uses contexts, i.e. the entropy encoding is a context-based encoding.

In step 310, a sign $s_{res,prev}$ of a previously entropy encoded non zero residual radius $r_{res,prev}$ associated with a previous point of the point cloud, is obtained.

In step 320, a context $Ctx_{sign}$ used by the context-based entropy encoding for encoding the sign $s_{res}$ of a residual radius $r_{res}$ of the current point, is obtained based on the sign $s_{res,prev}$.

For example, if sign $d_{res,prev}$ is positive then a first context $Ctx_{sign,1}$ is obtained and if sign $s_{res,prev}$ is negative then a second context $Ctx_{sign,2}$ is obtained.

In step 330, the sign $s_{res}$ of the residual radius $r_{res}$ is encoded in the bitstream B using a context-based entropy encoding using the context $Ctx_{sign}$.

On FIG. 10, the magnitude of a residual radius $r_{res}$ is encoded before the sign $s_{res}$ of the residual radius $r_{res}$. Alternatively, the sign $s_{res}$ of the residual radius $r_{res}$ may be encoded before the magnitude of a residual radius $r_{res}$.

In a variant, the Context Adaptive Binary Arithmetic Coder (CABAC) is used.

Figure 11:
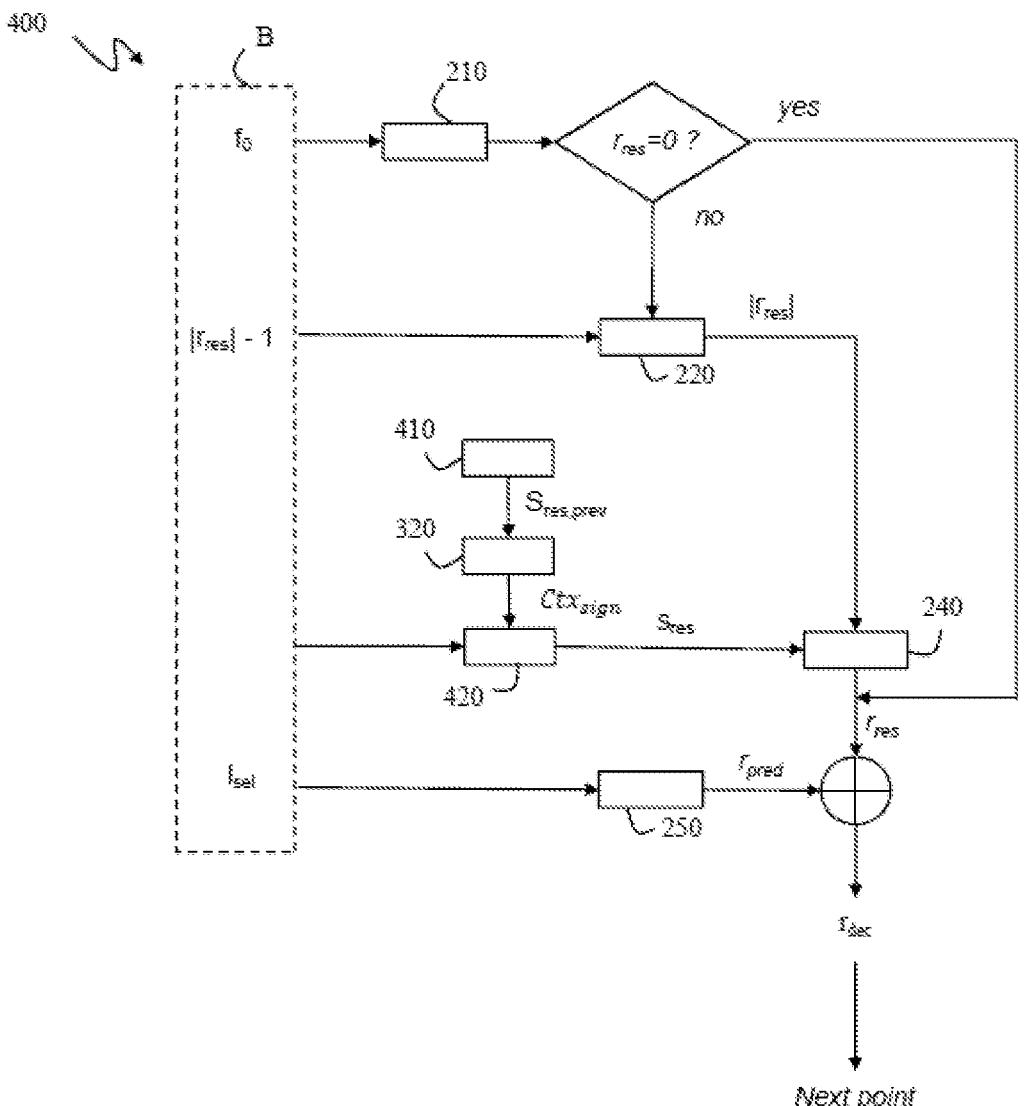
FIG. 11 illustrates a block diagram of steps of a method 400 of decoding residual radius from a bitstream in accordance with at least one embodiment of the present invention.

FIG. 11 illustrates a block diagram of steps of a method 400 of decoding residual radius $r_{res}$ from a bitstream B in accordance with at least one embodiment.

Figure 8:
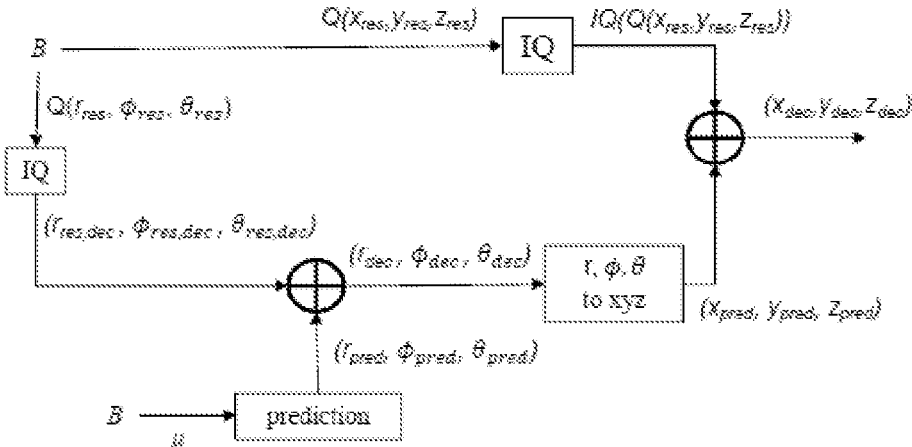
FIG. 8 illustrates a point cloud decoder that is similar to a G-PCC predictive tree based decoder in accordance with prior art.

The method is described for decoding a residual radius $r_{res}$ of a current point of the point cloud but extend to the decoding of quantized residual radius $Qr_{res}$ obtained, for example, as explained above in relation with FIG. 8 or in the one chain decoding.

In one embodiment of the method 400, the entropy decoding uses contexts, i.e. the entropy decoding is a context-based decoding.

In step 410, a sign $s_{res,prev}$ of a previously entropy decoded non zero residual radius $r_{res,prev}$ associated with a previous point, is obtained.

In step 320, a context $Ctx_{sign}$ used by the context-based entropy decoding for decoding the sign $s_{res}$ of a residual radius $r_{res}$ of the current point, is obtained based on the sign $s_{res,prev}$.

In step 420, a decoded sign $s_{res}$ of the residual radius $r_{res}$ is decoded from the bitstream B using a context-based entropy encoding using the context $Ctx_{sign}$.

In one embodiment of step 320, the current and previous points are captured by a same sensor of a spinning sensor head 10.

This embodiment provides compression gains if a predictive tree is built (as defined for example in G-PCC) so that, most of the time, point acquired by a same sensor are successively encoded; or if a predictive tree is built by the encoder so that successively encoded radius residuals have the same sign.

In one embodiment of step 320, the current and previous points are captured by different sensors of a spinning sensor head 10.

This embodiment also provides compression gains independently of the predictive tree built.

In one embodiment of step 320, the points of the point cloud captured by a same sensor are ordered according to a particular order, and the previous point is the last previous ordered point associated with an entropy encoded non-zero residual radius $r_{res,prev}$.

The sign of the previously encoded/decoded residual radius may be kept in memory for each sensor index. This sign is also updated after a residual radius sign and a sensor index of a new point have been encoded/decoded. Then, this mechanism may be used to retrieve the last previous point associated with a non zero entropy encoded residual radius $r_{res,prev}$.

In a variant, the points captured by a same sensor are ordered according to a coding order imposed by a predictive tree coding as defined in G-PCC.

In a variant, the predictive tree may be built such as to take into account a monotonicity in radius for the coding order of points captured by a same sensor.

In a variant, in the one chain coding/decoding methods, points of the point cloud having same coordinates (C$\phi$, $\lambda$) may be ordered in increasing (or decreasing) radius order.

Figures 12, 13:
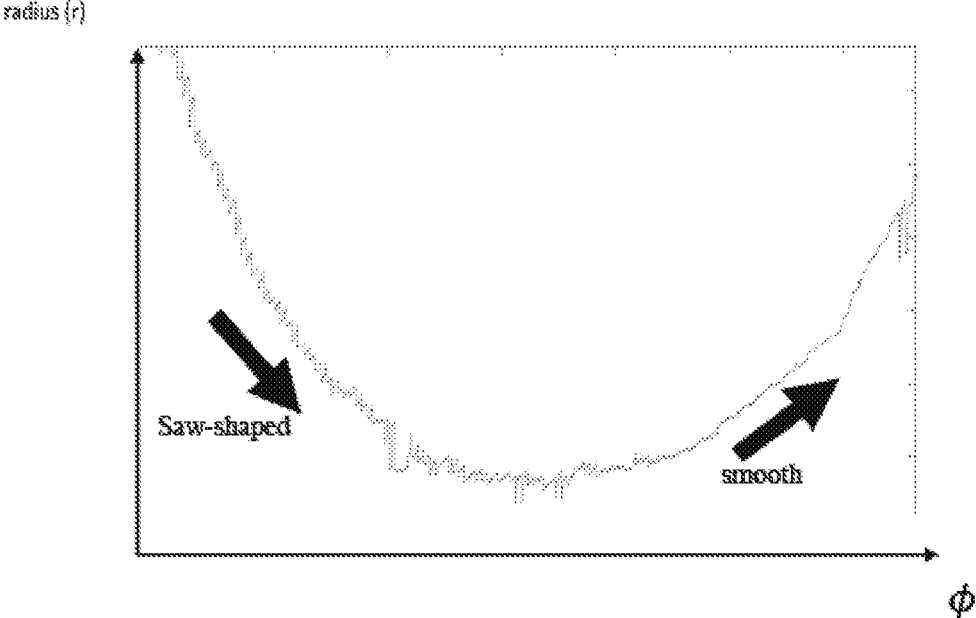
FIG. 12 illustrates an example of an evolution of the radius of points of a point cloud captured by a spinning sensor head in accordance with embodiment of the present invention.
FIG. 13 illustrates a block diagram of steps of a method 500 of adaptive radius ordering method 500 of captured points having same coordinates (C$\phi$, $\lambda$) in accordance with at least one embodiment of the present invention.

As shown in FIG. 12, it was observed that the evolution of the radius r is smooth when the radius r increases naturally during progress of the sensing of an object. However, when the radius r tends to decrease during progress of the sensing, a saw-shaped curve is observed. This is easily explained by the local increase (multiple captured points) for same coordinates (C$\phi$, $\lambda$) combined with the global decrease due to the sensing progression over the captured object.

In a variant, in the one chain coding/decoding methods, points of the point cloud having same coordinates (C$\phi$, $\lambda$) are adaptively ordered based on points of the point cloud captured with a same sensor index $\lambda$ (same sensor) but with different coarse coordinates.

FIG. 13 illustrates a block diagram of steps of a method 500 of adaptive radius ordering method 500 of captured points having same coordinates (C$\phi$, $\lambda$). The method 500 applies to the encoding side only.

Figure 14:
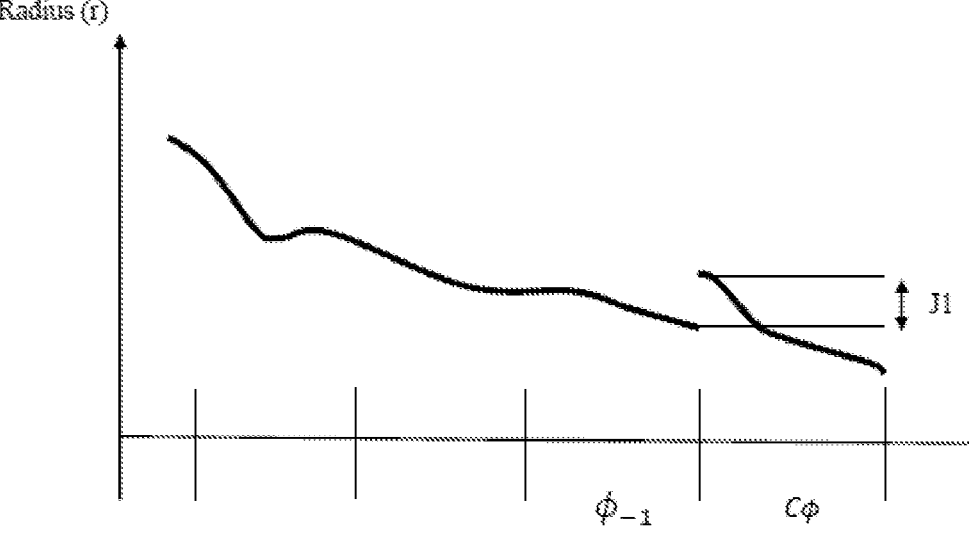
FIG. 14 illustrates the method 500 of FIG. 13.

In step 510, illustrated on FIG. 14, a first radius jump J1 is calculated between the highest radius of points having same coordinates (C$\phi$, $\lambda$) and the radius of the last point of previously ordered points associated with coordinates ($\phi_{-1}$, $\lambda$), where coordinate $\phi_{-1}$=C$\phi$−$\phi_{step}$.

Figure 15:
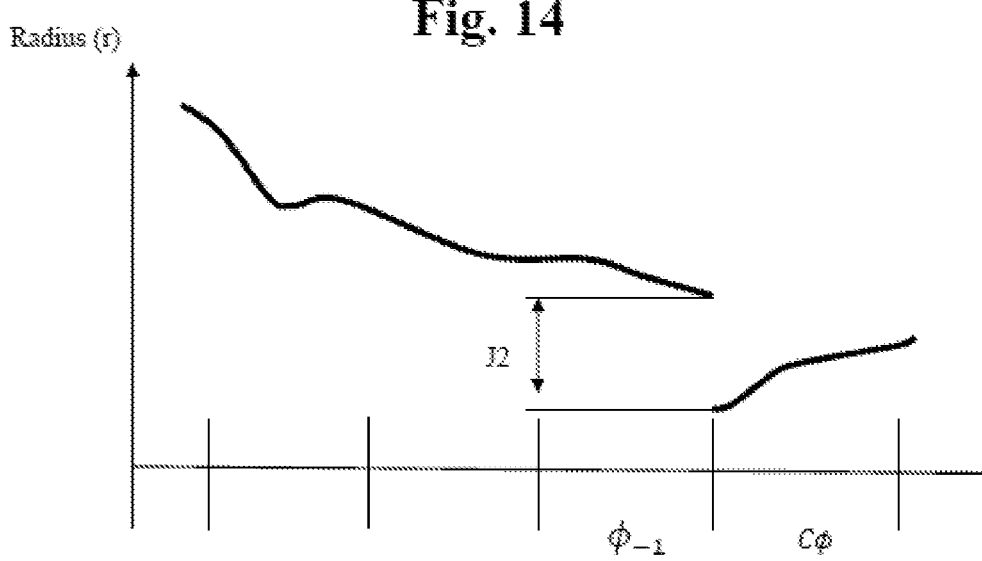
FIG. 15 illustrates the method 500 of FIG. 13.

In step 520, illustrated on FIG. 15, a second radius jump J2 is calculated between the lowest radius of points having same coordinates (C$\phi$, $\lambda$) and the radius of the last point of previously ordered points associated with coordinates ($\phi_{-1}$, $\lambda$).

In step 530, the points having same coordinates (C$\phi$, $\lambda$) are ordered in a decreasing radius order if the second radius jump J2 is higher than the first radius jump J1, as illustrated on FIG. 14, and in a increasing radius order (step 540) otherwise, as illustrated on FIG. 15. By doing so, the jump between the first point among points having same coordinates (C$\phi$, $\lambda$) and the last point of previously ordered points associated with coordinates ($\phi_{-1}$, $\lambda$) is minimized while maintaining local monotonicity of radius such as to profit from context coding of the sign of radius residuals.

Figure 16:
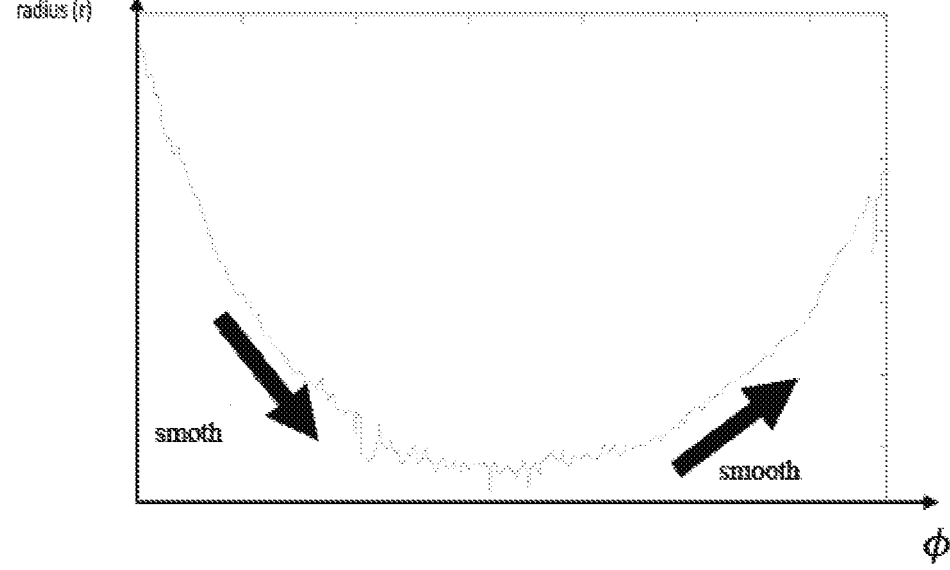
FIG. 16 illustrates an example of an evolution of the radius of points of a point cloud captured by a spinning sensor head in accordance with an embodiment of the present invention.

Furthermoe, applying the adaptive radius ordering method 500 to captured points having same coordinates (C$\phi$, $\lambda$) of FIG. 13 provides smoother and more monotonous evolution of the radius as shown in FIG. 16.

When the method 500 is applied to points of a point cloud having same coordinates (C$\phi$, $\lambda$), let us consider a current point P in a list of ordered points { . . . , $P_{-2}$; $P_{-1}$; P; . . . } having this same coordinate and such that P is at least the third point of said list of ordered points. Then, the sign $s_{res}$ of the residual radius associated with the currentpoint P is equal to the sign $s_{res,prec}$ of the residual radius associated with a previous point $P_{-1}$, assuming the radius of a previous point is selected as radius predictor. This is a direct consequence of the method 500 that imposes that the last three points have either a decreasing or a increasing radius, such that the signs of r(P)−r($P_{-1}$) and of r($P_{-1}$)−r($P_{-2}$) are equal, i.e. $s_{res}$=$s_{res,prec}$.

In one embodiment of step 320, a context Ctx$_{sign}$ is also obtained from a binary data $D_{last}$ indicating if the current point and the previous point in the list of ordered points are captured with a same coarse azimuthal angle C$\phi$.

This embodiment improves the overall coding efficiency of point cloud geometry data because it indicates when the sign $s_{res}$ of a residual radius associated with a current point captured by a sensor is likely predictable from a sign $s_{res,prev}$ of a previously entropy encoded non zero residual radius $r_{res,prev}$ associated with a previous point captured by the same sensor.

In one embodiment of step 320 that may be combined with the previous embodiment of step 320, a context Ctx$_{sign}$ is also obtained from a binary data $D_{penult}$ indicating if the current point is or not the at least third point $P_{penult}$ in the list of ordered points.

In one embodiment of step 320 adapted to the G-PCC encoding/decoding scheme, the integer number $\mu_{prev}$, signalled in or accessed from the bitstream B for previously encoded points of the point cloud (FIG. 7) may be stored in memory and the binary data $D_{penult}$ is then estimated from the stored integer number $\mu_{prev}$ associated with the previous point and/or the binary information $D_{last}$ are/is estimated from the integer number $\mu$ signaled in the bitstream.

In G-PCC, multiple points may be captured by a same sensor with same or different azimuthal angles. When two points are successively captured for a same azimuthal angle, the integer numbers $\mu$ is equal to 0 for the encoding of the two successively captured points. When a current and a previous points are successively captured with different azimuthal angles, the integer number $\mu$ used for encoding the current point equals 0 and the integer number used for encoding the previous point equas 1. Thus, the values of integer signaled in the bitstream B indicates similar information as binary data $D_{penult}$ and $D_{last}$.

For example, $D_{penult}$=0 if $\mu_{prev}$=0, else $D_{penult}$=1; and $D_{last}$=0 if $\mu$=0 else $D_{last}$=1.

Figure 5:
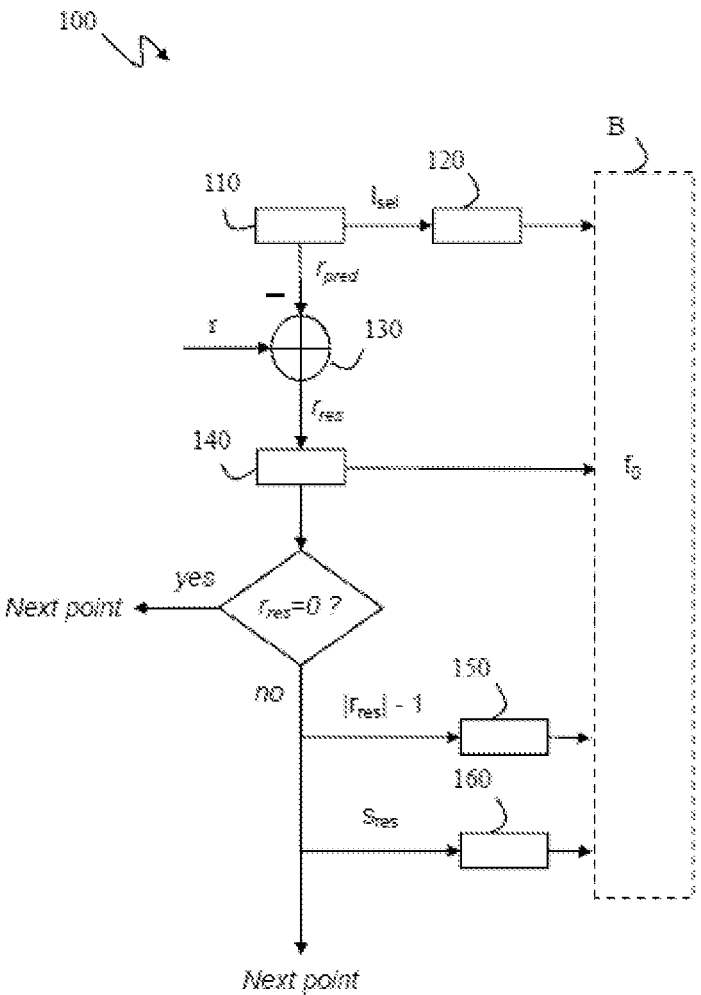
FIG. 5 illustrates a method 100 of encoding a residual radius in a bitstream in accordance with prior art.
Figure 6:
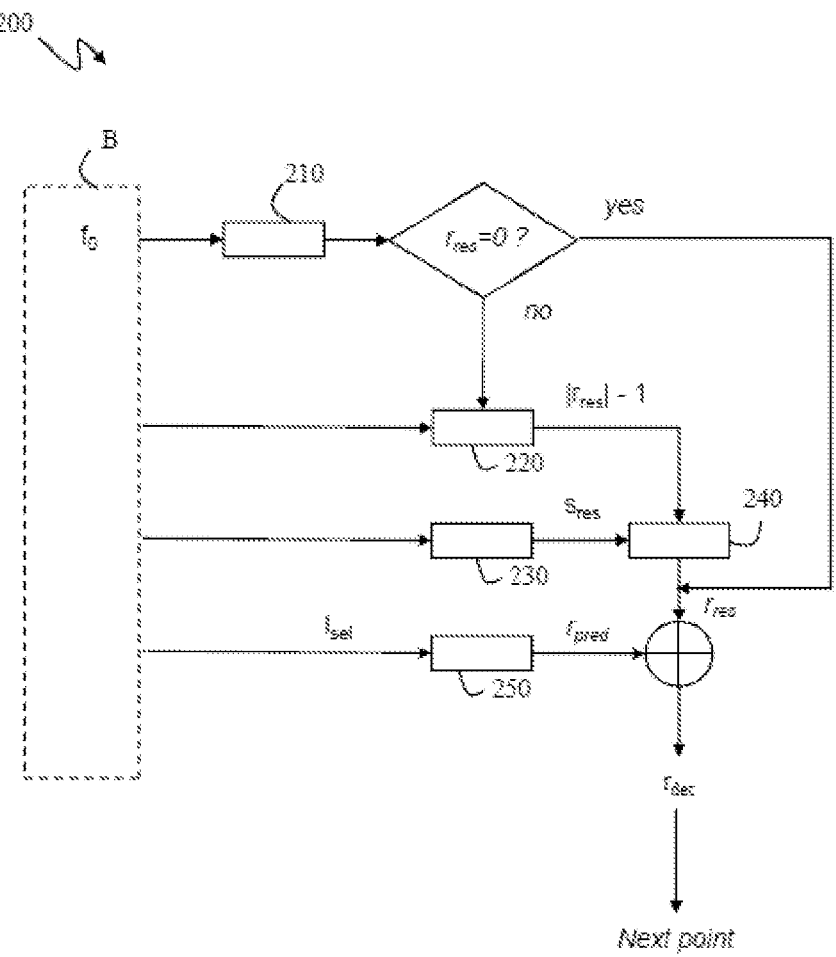
FIG. 6 illustrates a method 200 of decoding the radius from a bitstream in accordance with prior art.

In one embodiment of step 320, prediction mode index I$_{sel}$ (FIG. 5), signalled in or accessed from the bitstream B for previously encoded points of the point cloud (FIG. 7) may be stored in memory, and a context Ctx$_{sign}$ is then also obtained from the predictor mode index I$_{sel,prec}$ or the prediction mode identified in a list of candidate prediction modes by the prediction mode index I$_{sel}$.

For example, as above explained, candidate prediction modes indicate if a predicted radius depends or not on a parent node. Then, a binary data $D_{previous}$ may be determined from the predictor mode index I$_{sel,prec}$ to indicate if a predicted radius depends or not of a parent node of the current point.

In one embodiment of step 320, the context Ctx$_{sign}$ may be obtained from a context table ctxTab having as entry at least one of the following information: the first binary data $D_{last}$; the second binary data $D_{penult}$; the third binary data $D_{previous}$; the sign $s_{res,prev}$ of the previously entropy encoded non-zero residual radius $r_{res,prev}$.

For example, $$Ctx_{sign}=ctxTab[D_{penult}][D_{last}][s_{res,prec}]$$

or $$Ctx_{sign}=ctxTab[D_{previous}][D_{penult}][D_{last}][s_{res,prec}]$$

The present encoding/decoding method can be used to encode/decode the point cloud which may be used for various purposes, especially used to encode/decode the signs of the residual radius, which may decrease the coding cost of the signs and thus improve overall coding efficiency of point coud geometry data captured by a spinning sensor head.

Figure 17:
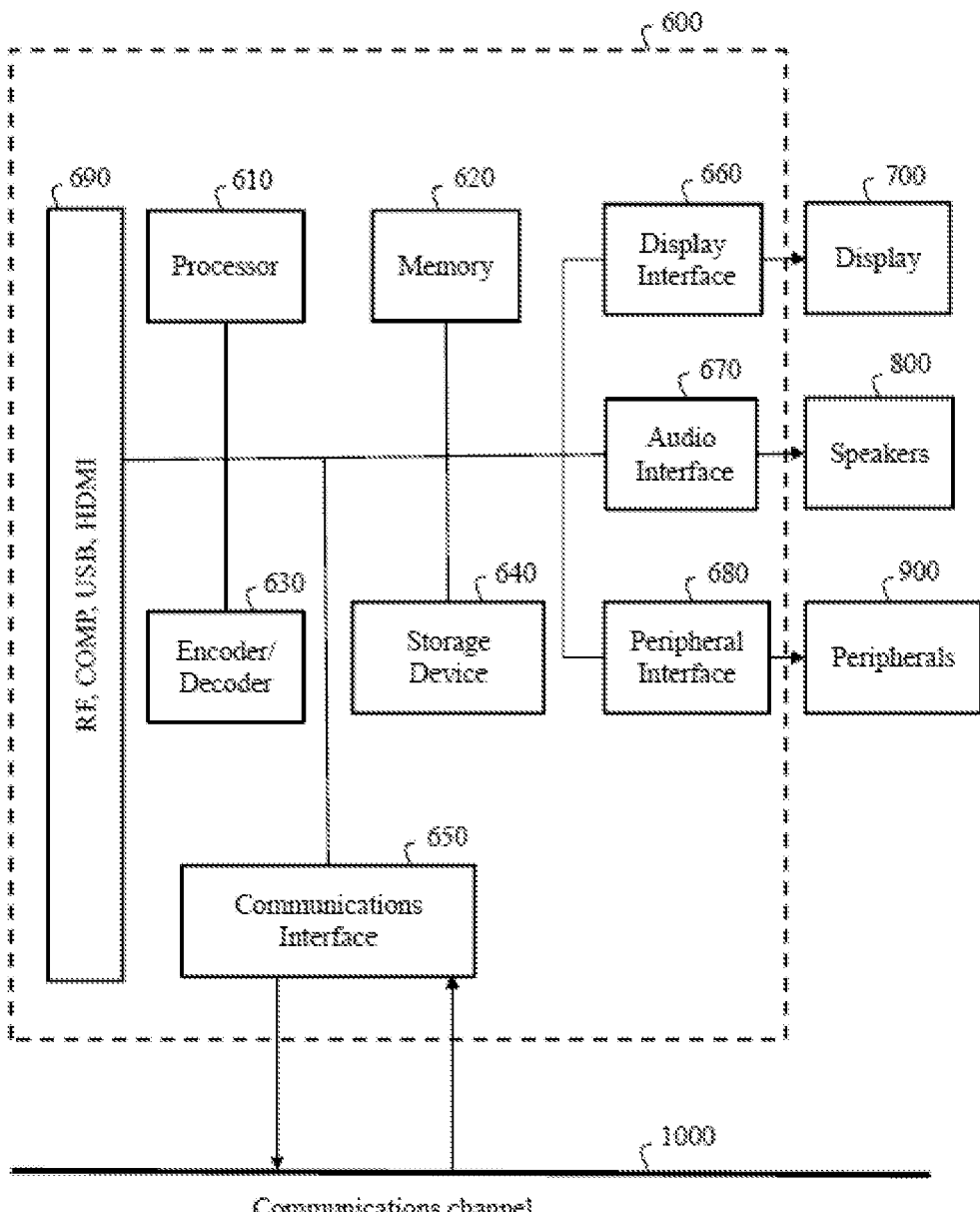
FIG. 17 illustrates a schematic block diagram of an example of a system in which various aspects and embodiments are implemented.

FIG. 17 shows a schematic block diagram illustrating an example of a system in which various aspects and embodiments are implemented.

System 600 may be embedded as one or more devices including the various components described below. In various embodiments, the system 600 may be configured to implement one or more of the aspects described in the present application.

Examples of equipment that may form all or part of the system 600 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 600, singly or in combination, may be embodied in a single integrated circuit (IC), multiple ICs, and/or discrete components. For example, in at least one embodiment, the processing and encoder/decoder elements of system 600 may be distributed across multiple ICs and/or discrete components. In various embodiments, the system 600 may be communicatively coupled to other similar systems, or to other electronic devices, via, for example, a communications bus or through dedicated input and/or output ports.

The system 600 may include at least one processor 610 configured to execute instructions loaded therein for implementing, for example, the various aspects described in the present application. Processor 610 may include embedded memory, input output interface, and various other circuitries as known in the art. The system 600 may include at least one memory 620 (for example a volatile memory device and/or a non-volatile memory device). System 600 may include a storage device 640, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 640 may include an internal storage device, an attached storage device, and/or a network accessible storage device, as non-limiting examples.

The system 600 may include an encoder/decoder module 630 configured, for example, to process data to provide encoded/decoded point cloud geometry data, and the encoder/decoder module 630 may include its own processor and memory. The encoder/decoder module 630 may represent module(s) that may be included in a device to perform the encoding and/or decoding functions. As is known, a device may include one or both of the encoding and decoding modules. Additionally, encoder/decoder module 630 may be implemented as a separate element of system 600 or may be incorporated within processor 610 as a combination of hardware and software as known to those skilled in the art.

Program code to be loaded onto processor 610 or encoder/decoder 630 to perform the various aspects described in the present application may be stored in storage device 640 and subsequently loaded onto memory 620 for execution by processor 610. In accordance with various embodiments, one or more of processor 610, memory 620, storage device 640, and encoder/decoder module 630 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 610 and/or the encoder/decoder module 630 may be used to store instructions and to provide working memory for processing that may be performed during encoding or decoding.

In other embodiments, however, a memory external to the processing device (for example, the processing device may be either the processor 610 or the encoder/decoder module 630) may be used for one or more of these functions. The external memory may be the memory 620 and/or the storage device 640, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 600 may be provided through various input devices as indicated in block 690. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 690 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 600 to other electronic devices across USB and/or HDMI connections. It is to be understood that various aspects of input processing, for example, Reed-Solomon error correction, may be implemented, for example, within a separate input processing IC or within processor 610 as necessary. Similarly, aspects of USB or HDMI interface processing may be implemented within separate interface ICs or within processor 610 as necessary. The demodulated, error corrected, and demultiplexed stream may be provided to various processing elements, including, for example, processor 610, and encoder/decoder 630 operating in combination with the memory and storage elements to process the data stream as necessary for presentation on an output device.

Various elements of system 600 may be provided within an integrated housing. Within the integrated housing, the various elements may be interconnected and transmit data therebetween using suitable connection arrangement 690, for example, an internal bus as known in the art, including the I2C bus, wiring, and printed circuit boards.

The system 600 may include communication interface 650 that enables communication with other devices via communication channel 1000. The communication interface 650 may include, but is not limited to, a transceiver configured to transmit and to receive data over communication channel 1000. The communication interface 650 may include, but is not limited to, a modem or network card and the communication channel 1000 may be implemented, for example, within a wired and/or a wireless medium.

Data may be streamed to the system 600, in various embodiments, using a Wi-Fi network such as IEEE 802.11. The Wi-Fi signal of these embodiments may be received over the communications channel 1000 and the communications interface 650 which are adapted for Wi-Fi communications. The communications channel 1000 of these embodiments may be typically connected to an access point or router that provides access to outside networks including the Internet for allowing streaming applications and other over-the-top communications.

Other embodiments may provide streamed data to the system 600 using a set-top box that delivers the data over the HDMI connection of the input block 690.

Still other embodiments may provide streamed data to the system 600 using the RF connection of the input block 690.

The streamed data may be used as a way for signaling information used by the system 600. The signaling information may comprise the bitstream B comprising at least the flag $f_0$, information representing a sign $s_{res}$ of a residual radius $r_{res}$ encoded using a context-based entropy encoding using the context $Ctx_{sign}$ and a magnitude of a residual radius, a number of points of a point cloud, coordinates or order $o(P_1)$ of a first point in the 2D coordinates $(C\phi, \lambda)$ system and/or sensor setup parameters such as the parameter $\mu$ or an elevation angle $\theta_k$ associated with a sensor of the spinning sensor head 10.

It is to be appreciated that signaling may be accomplished in a variety of ways. For example, one or more syntax elements, flags, and so forth may be used to signal information to a corresponding decoder in various embodiments.

The system 600 may provide an output signal to various output devices, including a display 700, speakers 800, and other peripheral devices 900. The other peripheral devices 900 may include, in various examples of embodiments, one or more of a stand-alone DVR, a disk player, a stereo system, a lighting system, and other devices that provide a function based on the output of the system 600.

In various embodiments, control signals may be communicated between the system 600 and the display 700, speakers 800, or other peripheral devices 900 using signaling such as AV.Link (Audio/Video Link), CEC (Consumer Electronics Control), or other communications protocols that enable device-to-device control with or without user intervention.

The output devices may be communicatively coupled to system 600 via dedicated connections through respective interfaces 660, 670, and 680.

Alternatively, the output devices may be connected to system 600 using the communications channel 1000 via the communications interface 650. The display 700 and speakers 800 may be integrated in a single unit with the other components of system 600 in an electronic device such as, for example, a television.

In various embodiments, the display interface 660 may include a display driver, such as, for example, a timing controller (T Con) chip.

The display 700 and speaker 800 may alternatively be separate from one or more of the other components, for example, if the RF portion of input 690 is part of a separate set-top box. In various embodiments in which the display 700 and speakers 800 may be external components, the output signal may be provided via dedicated output connections, including, for example, HDMI ports, USB ports, or COMP outputs.

In FIG. 1-17, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 410 or by hardware, or by a combination of hardware and software. As a non-limiting example, the embodiments may be also implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/ process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer to entropy decoding, in another embodiment "decoding" may refer only to differential decoding, and in another embodiment "decoding" may refer to combinations of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only may refer only to entropy encoding, in another embodiment "encoding" may refer only to differential encoding, and in another embodiment "encoding" may refer to combinations of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory or bitstream), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory or bitstream). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a flag $f_0$, information representing a sign $s_{res}$ of a residual radius $r_{res}$ encoded using a context-based entropy encoding using the context $Ctx_{sign}$, a magnitude of a residual radius, a number of points of the point cloud or coordinates or order $o(P_1)$ of a first point in the 2D coordinates $(C\phi, \lambda)$ system or sensor setup parameters such as the parameter $\mu$ or an elevation angle $\theta_k$ associated with a sensor k. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a bitstream of encoded point cloud data representing a physical object, each point of the point cloud being associated with a residual radius between a radius responsive to a distance of the point from a referential and a predicted radius, the method comprising:

entropy coding a sign ($S_{res}$) of a residual radius ($r_{res}$) associated with a current point of the point cloud based on a sign ($S_{res,prev}$) of a previously entropy encoded non-zero residual radius ($r_{res,prev}$) associated with a previous point of the point cloud.

2. The method of claim 1, wherein each point of the point cloud is associated with coordinates comprising a azimuthal angle ($C\phi$) representing a capture angle of sensors of a spinning sensor head, and a sensor index ($\lambda$) associated with a sensor that captured the point, wherein points of the point cloud having same coordinates ($C\phi\lambda$) are adaptively ordered based on points of the point cloud captured with a same sensor index ($\lambda$) but with different azimuthal angle coordinates ($C\phi$).

3. A method of decoding a point cloud from a bitstream of encoded point cloud data representing a physical object, each point of the point cloud being associated with a residual radius between a radius responsive to a distance of the point from a referential and a predicted radius, the method comprising:

entropy decoding a sign ($S_{res}$) of a residual radius ($r_{res}$) associated with a current point of the point cloud based on a sign ($S_{res,prev}$) of a previously entropy decoded non-zero residual radius ($r_{res,prev}$) associated with a previous point of the point cloud.

4. The method of claim 1, wherein the entropy coding or decoding of the sign ($S_{res}$) of the residual radius ($r_{res}$) of the current point is a context-based entropy coding or decoding using a context ($Ctx_{sign}$) based on the sign ($S_{res,prev}$) of the previously entropy encoded or decoded non-zero residual radius ($f_{res,prev}$).

5. The method of claim 1, wherein the current and previous points are captured by different sensors of a spinning sensor head.

6. The method of claim 1, wherein the current and previous points are captured by a same sensor of a spinning sensor head.

7. The method of claim 4, wherein the points of the point cloud are ordered according to a particular order, and the previous point is the last previous ordered point associated with an entropy encoded non-zero residual radius ($r_{res,prev}$).

8. The method of claim 7, wherein each point of the point cloud is associated with coordinates comprising a azimuthal angle ($C\phi$) representing a capture angle of sensors of a spinning sensor head, and a sensor index ($\lambda$) associated with a sensor that captured the point, wherein the context ($Ctx_{sign}$) is obtained from first binary data ($D_{last}$) indicating if the current point and the previous point of the ordered points are captured with a same azimuthal angle.

9. The method of claim 7, wherein the context ($Ctx_{sign}$) is obtained from second binary data ($D_{penult}$) indicating whether or not the current point is a third point of the ordered points.

10. The method of claim 7, wherein the points of the point cloud are associated to nodes of a tree, wherein the context ($Ctx_{sign}$) is obtained from third binary data ($D_{previous}$) indicating whether or not a predicted radius, used for obtained obtaining the residual radius associated with a current point, depends on er net of a parent node of the current point.

11. The method of claim 7, wherein the context ($Ctx_{sign}$) is obtained from a context table (ctxTab) having as entry at least one of:

the first binary data ($D_{last}$);
second binary data ($D_{penult}$);
third binary data ($D_{previous}$); or
the sign ($S_{res,prev}$) of the previously entropy encoded non-zero residual radius ($r_{res,prev}$).

12. An apparatus of encoding a point cloud into a bitstream of encoded point cloud data representing a physical object, each point of the point cloud being associated with a residual radius between a radius responsive to a distance of the point from a referential and a predicted radius, the apparatus comprising:

one or more processors configured to perform entropy coding on a sign ($S_{res}$) of a residual radius ($r_{res}$) associated with a current point of the point cloud based on a sign ($S_{res,prev}$) of a previously entropy encoded non-zero residual radius ($r_{res,prev}$) associated with a previous point of the point cloud.

13. An apparatus of decoding a point cloud from a bitstream of encoded point cloud data representing a physical object, each point of the point cloud being associated with a residual radius between a radius responsive to a distance of the point from a referential and a predicted radius, the apparatus comprising one or more processors configured to perform the method of claim 3.

14. A non-transitory storage medium carrying instructions of program code for executing the method of claim 3.

15. A non-transitory storage medium carrying instructions of program code for executing the method of claim 1.

16. The method of claim 3, wherein the entropy decoding of the sign ($S_{res}$) of the residual radius ($r_{res}$) of the current point is a context-based entropy decoding using a context ($Ctx_{sign}$) based on the sign ($S_{res,prev}$) of the previously entropy decoded non-zero residual radius ($r_{res,prev}$).

17. The method of claim 3, wherein the current and previous points are captured by different sensors of a spinning sensor head.

18. The method of claim 3, wherein the current and previous points are captured by a same sensor of a spinning sensor head.

19. The method of claim 16, wherein the points of the point cloud are ordered according to a particular order, and the previous point is the last previous ordered point associated with an entropy decoded non-zero residual radius ($r_{res,prev}$).

20. The method of claim 19, wherein each point of the point cloud is associated with coordinates comprising a azimuthal angle ($C\phi$) representing a capture angle of sensors of a spinning sensor head, and a sensor index ($\lambda$) associated with a sensor that captured the point, wherein the context ($Ctx_{sign}$) is obtained from first binary data ($D_{last}$) indicating whether or not the current point and the previous point of the ordered points are captured with a same azimuthal angle.

* * * * *